(12) United States Patent
Waters

(10) Patent No.: US 6,857,661 B2
(45) Date of Patent: Feb. 22, 2005

(54) PARTITIONED FUEL TANK AND FUEL DELIVERY SYSTEM

(75) Inventor: Scott Waters, Arlington, TX (US)

(73) Assignee: American IronHorse Motorcycle Company, Fort Worth, TX (US)

( * ) Notice: Subject to any disclaimer, the term of this patent is extended or adjusted under 35 U.S.C. 154(b) by 87 days.

(21) Appl. No.: 10/364,499

(22) Filed: Feb. 12, 2003

(65) Prior Publication Data

US 2004/0155043 A1 Aug. 12, 2004

(51) Int. Cl.[7] .............................................. B62J 35/00
(52) U.S. Cl. ...................................... 280/830; 280/833
(58) Field of Search ......................... 180/219; 280/830, 280/833, 834, 835

(56) References Cited

U.S. PATENT DOCUMENTS

| 3,722,529 | A |   | 3/1973  | Arakawa              |
| 4,143,193 | A | * | 3/1979  | Rees ........................ 220/555 |
| 4,188,969 | A |   | 2/1980  | Lotton et al.        |
| 4,385,676 | A |   | 5/1983  | Yoshimura            |
| 4,449,723 | A | * | 5/1984  | Shiratsuchi ................. 280/833 |
| 4,492,250 | A |   | 1/1985  | Ohmori et al.        |
| 5,542,706 | A | * | 8/1996  | Kubly ........................ 280/833 |
| 6,145,691 | A |   | 11/2000 | Inaoka et al.        |
| 6,213,239 | B1|   | 4/2001  | Onishi et al.        |
| 6,381,823 | B1|   | 5/2002  | Krejci               |
| 6,478,335 | B2| * | 11/2002 | Reed .......................... 280/835 |
| 6,484,746 | B2|   | 11/2002 | Tine, Jr.             |

\* cited by examiner

*Primary Examiner*—Lesley D. Morris
*Assistant Examiner*—Tony Winner
(74) *Attorney, Agent, or Firm*—Venable LLP; Stuart I. Smith

(57) ABSTRACT

A tank for storing a fluid is provided. The tank has an outer shell defining an inner volume for containing the fluid, a filler opening in the outer shell for placing the fluid into the tank, and a partition within the outer shell. The partition divides the inner volume into a first lower portion, a second lower portion, and a common portion. A first drain opening is located in the first lower portion and a second drain opening is located in the second lower portion. The partition separates the first lower portion from the second lower portion such that when the tank is in an operating position the fuel is prevented from passing between the first lower portion and the second lower portion.

18 Claims, 6 Drawing Sheets

PARTITIONED FUEL TANK AND FUEL DELIVERY SYSTEM

BACKGROUND OF THE INVENTION

The invention relates to fluid storage tanks and delivery systems. More particularly, the invention relates to fuel storage tanks and delivery systems for vehicles.

Many motorcycles have fuel delivery systems that provide a reserve fuel tank or a reserve portion of a main fuel tank that requires interaction by the rider to access. Such fuel reserves serve the purpose of warning the rider that only a specific amount of fuel remains in the fuel tank or tanks. Many of these systems include a valve, or petcock, that is switchable between three positions, a closed position where no fuel flows, an open position which allows fuel to flow from the main portion of the tank, and a reserve position which allows fuel to flow from a reserve tank, a reserve portion of the main tank, or the entire main tank including the reserve portion.

SUMMARY OF THE INVENTION

Several problems exist with the conventional reserve fuel system described above. For example, to gain the benefit of being warned about a low fuel condition in the fuel tank, the petcock must be returned to the open position from the reserve position after refueling. In normal operation, the motorcycle would be operated with the petcock set to the open position until such time as the engine stops, or begins to stop, due to fuel starvation. At this time, the rider switches the petcock from the open position to the reserve position to access fuel located in the reserve tank or the reserve portion of the main tank. The rider should then proceed to a gas station to refill the fuel tank. After refueling, the petcock should be returned to the open position in order to draw fuel from only the main tank and not from the reserve tank or reserve portion of the main tank. However, if the petcock is not returned to the open position but is, instead, left in the reserve position, it is possible to completely drain the fuel tank (including the reserve portion) without any warning that the reserve portion of the fuel is being used.

Embodiments of the invention address the above-described problem by providing a fuel tank having a particular structure and a petcock having two open positions and one closed position. Due to the structure of the fuel tank, either open position can be used as the normal running position to drain a majority of the fuel tank with the other open position being used to drain the remaining portion of the fuel tank.

Embodiments of the inventions provide a tank for storing a fluid. The tank has an outer shell defining an inner volume for containing the fluid, a filler opening in the outer shell for placing the fluid into the tank, and a partition within the outer shell. The partition divides the inner volume into a first lower portion, a second lower portion, and a common portion. A first drain opening is located in the first lower portion and a second drain opening is located in the second lower portion. The partition separates the first lower portion from the second lower portion such that when the tank is in an operating position the fuel is prevented from passing between the first lower portion and the second lower portion.

Other embodiments of the invention provide a fuel storage and delivery system for storing fuel and delivering the fuel to an engine. The system has a tank and a fuel valve functionally positioned between the tank and the engine. The tank has an outer shell defining an inner volume for containing the fuel, a filler opening in the outer shell for placing the fuel into the tank, and a partition within the outer shell. The partition divides the inner volume into a first lower portion, a second lower portion, and a common portion. A first drain opening is located in the first lower portion and a second drain opening is located in the second lower portion. The partition separates the first lower portion from the second lower portion such that when the tank is in an operating position the fuel is prevented from passing between the first lower portion and the second lower portion. The valve has an outlet for functionally connecting to the engine, a first inlet functionally connected to the first drain opening of the tank, a second inlet functionally connected to the second drain opening of the tank, a closed position for preventing the fuel from being delivered to the engine, a first open position for allowing the fuel to flow from the first inlet to the engine, and a second open position for allowing the fuel to flow from the second inlet to the engine.

Other embodiments of the invention provide a fuel tank for a motorized vehicle. The tank has an outer shell defining an inner volume for containing the fuel, the outer shell having a tunnel formed in a lower portion of the outer shell, a filler opening in the outer shell for placing the fuel into the tank, and a partition within the outer shell. The partition divides the inner volume into a first lower portion, a second lower portion, and a common portion. The partition is attached at its lower edge to a top of the tunnel and is attached at its upper edge to an upper portion of the outer shell. A first drain opening is located in the first lower portion and a second drain opening located in the second lower portion. The partition separates the first lower portion from the second lower portion such that when the tank is in an operating position the fuel is prevented from passing between the first lower portion and the second lower portion. The outer shell and the partition are configured such that only that portion of the fuel located in the common portion and the first lower portion drains from the tank through the first drain opening, and the outer shell and the partition are configured such that only that portion of the fuel located in the common portion and the second lower portion drains from the tank through the second drain opening.

BRIEF DESCRIPTION OF THE DRAWINGS

The invention is explained below in further detail with the aid of exemplary embodiments shown in the drawings, wherein.

DETAILED DESCRIPTION OF THE INVENTION

Figure 1:
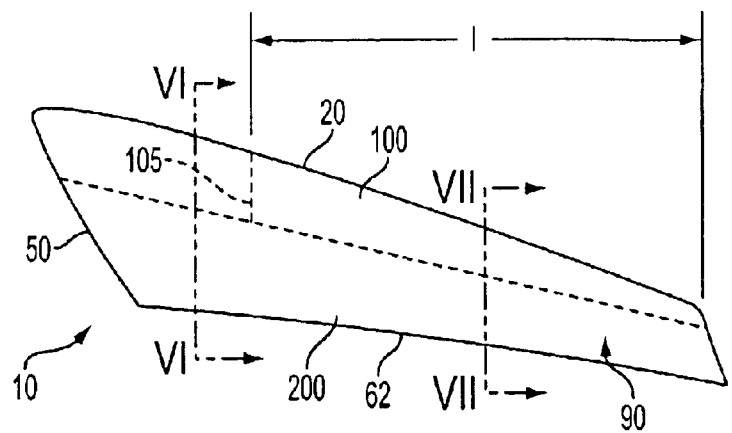
FIG. 1 is a left side view of an example of a first embodiment of the invention.
Figure 2:
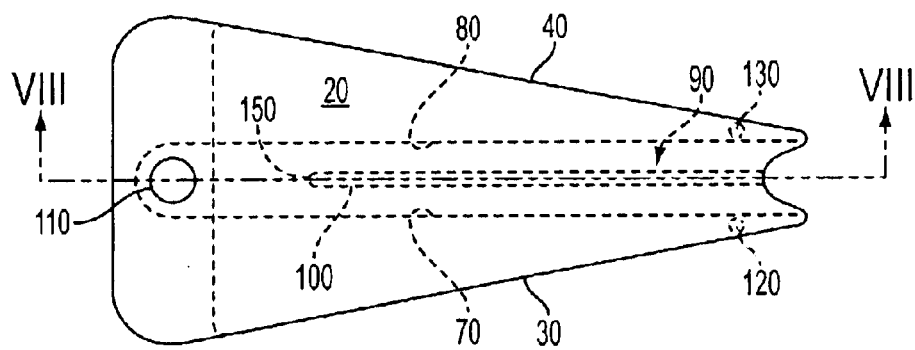
FIG. 2 is a top view of an example of the first embodiment of the invention.
Figure 3:
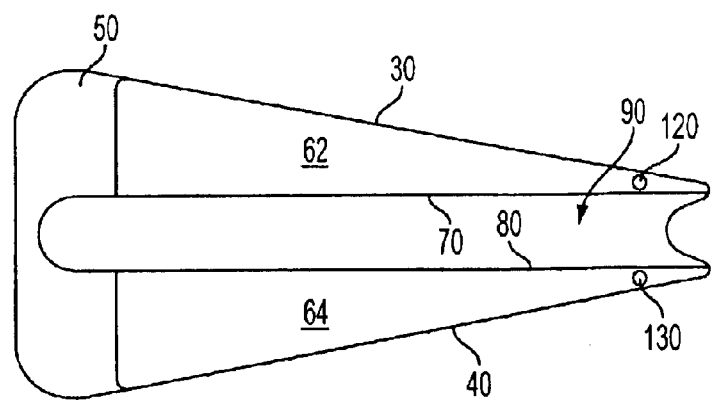
FIG. 3 is a bottom view of an example of the first embodiment of the invention.

The invention is explained in the following with the aid of the drawings in which like reference numbers represent like elements.

FIGS. 1–5 show a tank 10 such as, for example, a fuel tank for a motorcycle. Tank 10 has an outer shell defining an inner volume for containing the fuel. The outer shell has, in this example, a top wall 20, a left side wall 30, a right side wall 40, a front wall 50, a left bottom wall 62 and a right bottom wall 64. In addition, tank 10 has a tunnel 90 having a left tunnel wall 70 and a right tunnel wall 80. Tunnel 90 is provided to allow tank 10 to straddle a frame member of the motorcycle.

Tank 10 is provided with structure that partitions the interior volume of the tank such that the interior volume can be thought of as being made up of a left lower portion, a right lower portion and a common portion. In the example shown in the drawings, the separating structure is comprised of tunnel walls 70, 80 and a partition 100. In this example, partition 100 has a leading edge 105 and a length l. Partition 100 is attached, in this example welded, at its top edge to the underside of top wall 20 and at its lower edge to the top of tunnel walls 70, 80 such that partition 100 prevents fuel from passing over tunnel 90 at any location along length l of partition 100. As a result, two lower portions of tank 10 are created between which fuel cannot flow. The advantages of this structure will be discussed further below.

Tank 10 is also provided with a filler hole 110 that is used to put fuel into tank 10 and left and right drain holes 120, 130 to drain fuel from tank 10.

Figure 4:
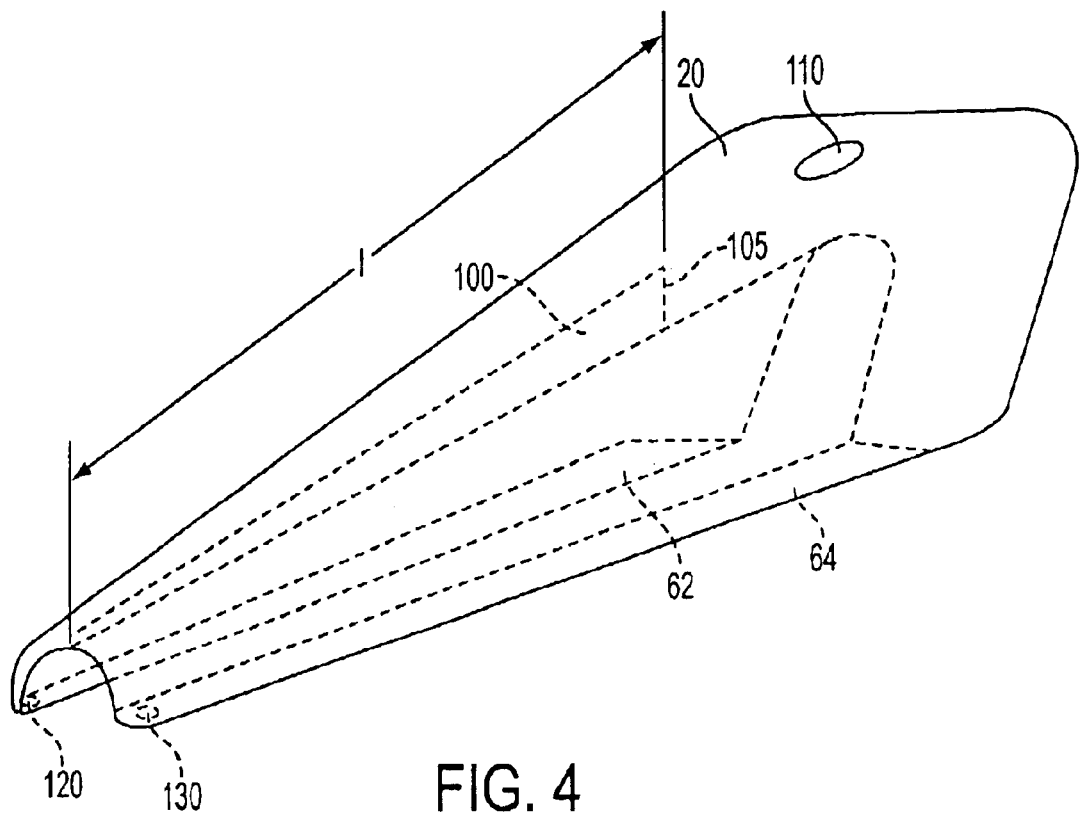
FIG. 4 is a perspective view of an example of the first embodiment of the invention.
Figure 5:
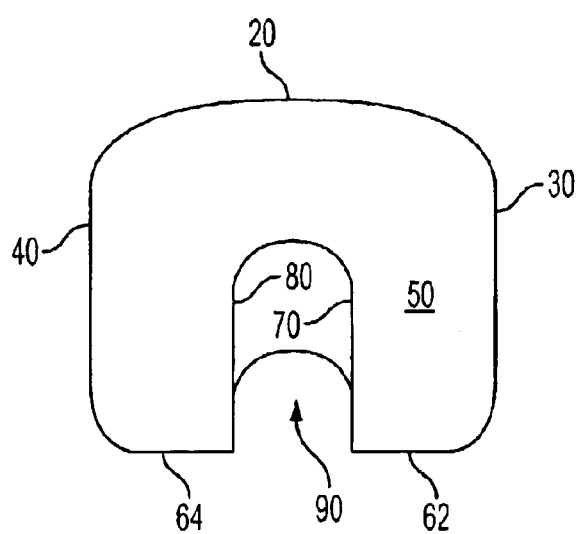
FIG. 5 is a front view of an example of the first embodiment of the invention.

FIG. 4 is a perspective view of tank 10 that further illustrates how partition 100 fills the space between the top of tunnel 90 and top wall 20 to prevent fuel from flowing over tunnel 90. FIG. 5 is a front view of tank 10 further illustrating the relationship of the various walls and tunnel 90.

Figure 6:
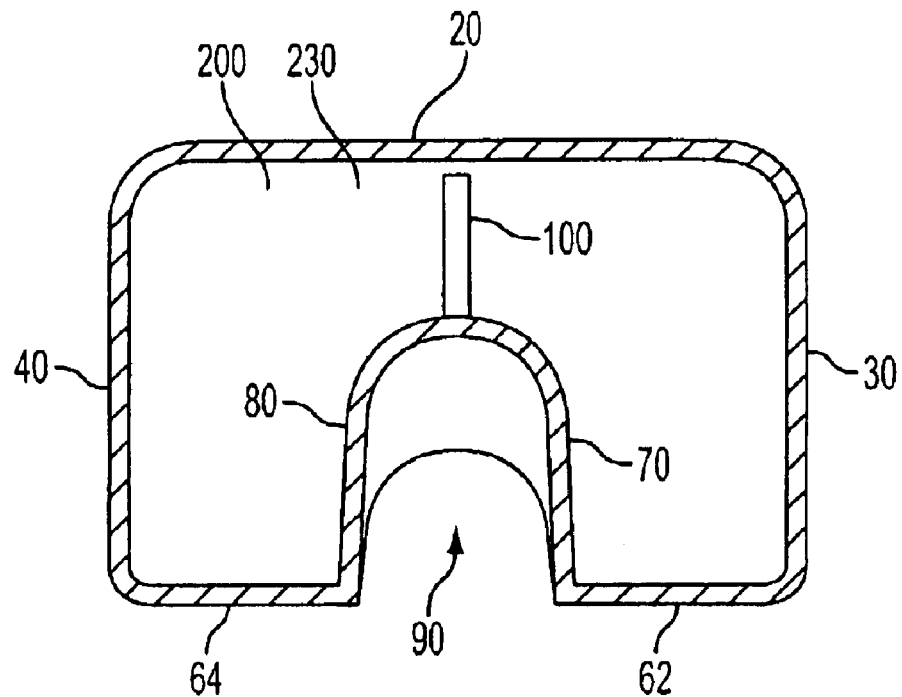
FIG. 6 is a sectional view along section line VI—VI of the example of the first embodiment of the invention shown in FIG. 1.
Figure 7:
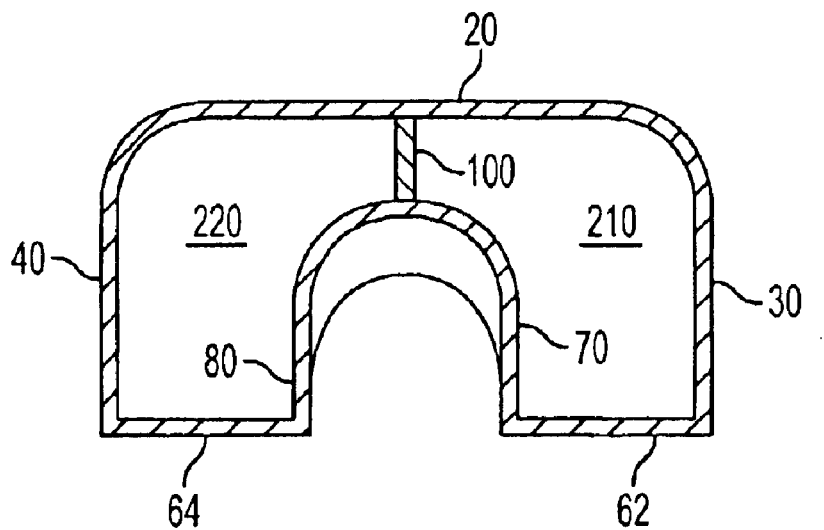
FIG. 7 is a sectional view along section line VII—VII of the example of the first embodiment of the invention shown in FIG. 1.
Figure 8:
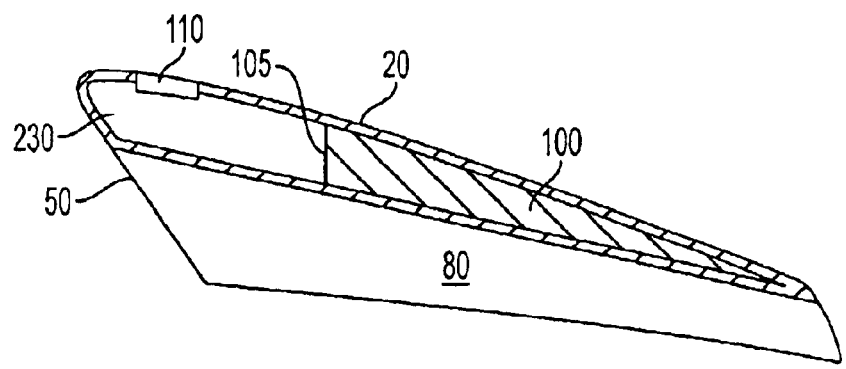
FIG. 8 is a sectional view along section line VIII—VIII of the example of the first embodiment of the invention shown in FIG. 2.

FIGS. 6 and 7 are sectional views taken along section lines VI—VI and VII—VII, respectively, in FIG. 1. FIG. 6 sections tank 10 at a longitudinal location where partition 100 does not exist. At such a location, fuel is free to flow over tunnel 90 between the left and right sides of the tank. FIG. 7 sections tank 110 at a location where partition 100 exists. At such a location, an interior volume 200 of tank 10 is divided into a left lower volume 210 and a right lower volume 220. Referring back to FIG. 6, at locations along the length of tank 10 where partition 100 does not exist, fuel that occupies a portion of interior volume 200 (referred to a common volume 230) can flow between the left and right sides of the tank. Common volume 230 is defined as the space from which fuel can flow into either left lower volume 210 or right lower volume 220. FIG. 8 is a longitudinal cross section taken along section line VIII—VIII in FIG. 2. This section is taken through top wall 20, front wall 50, the upper portion of right tunnel wall 80 where it contacts left tunnel wall 70, and partition 100. FIG. 8 clearly shows the portion of tank 10 through which fuel can flow between the left and right sides of the tank. This portion is a part of common volume 230.

A purpose of partition 100 is to separate the tank into the three parts of interior volume 200, namely left lower volume 210, right lower volume 220 and common volume 230. By separating interior volume 200 into these three portions, a fuel tank is provided that allows draining of common volume 230 and left lower volume 210 through left drain hole 120 and allows draining of common volume 230 and right lower volume 220 through right drain hole 130.

Figure 15:
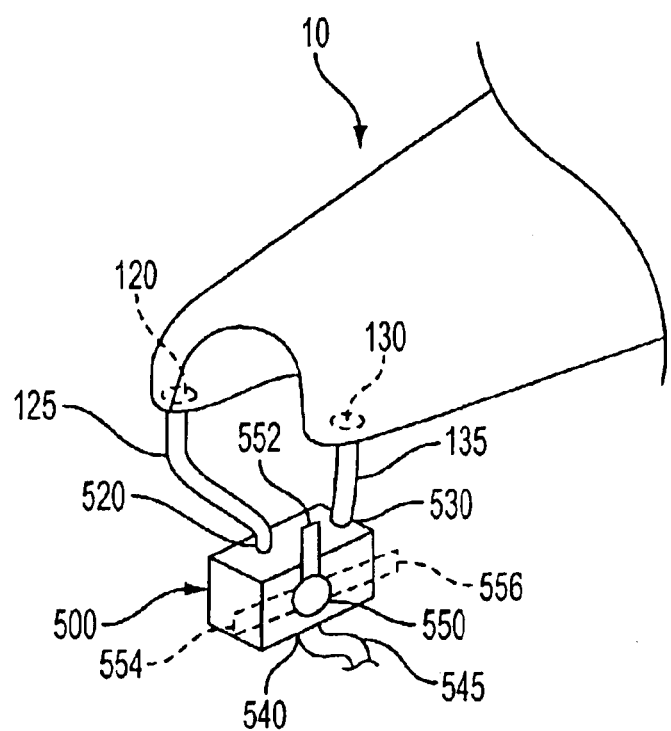
FIG. 15 shows an example of a fuel tank and a valve in accordance with the invention.

FIG. 15 shows a valve 500 used to control the flow of fuel from tank 10. A first inlet 520 of valve 500 is attached to left drain hole 120 by a left drain pipe 125. A second inlet 530 of valve 500 in connected to right drain hole 130 by a right drain pipe 135. Valve 500 has a selector switch 550 that is movable between a closed position 552 (the position in which selector switch 550 in shown in FIG. 15), a first open position 554 and a second open position 556. Valve 500 also has an outlet 540 connected to, in this example, the motorcycle engine by an outlet pipe 545. When selector switch 550 is in closed position 552, no fuel flows to outlet 540. When selector switch 550 is in first open position 554, fuel flows from left drain hole 120 through left drain pipe 125, first inlet 520, valve 500, outlet 540 and outlet pipe 545. When selector switch 550 is in second open position 556, fuel flows from right drain hole 130 through right drain pipe 135, second inlet 530, valve 500, outlet 540 and outlet pipe 545. As a result, when tank 10 is full of fuel, fuel can be drained from common volume 230 and left lower volume 210 through left drain hole 120 when selector switch 550 is in first open position 554. Similarly, fuel can be drained from common volume 230 and right lower volume 220 through right drain hole 130 when selector switch 550 is in second open position 556.

Figure 9:
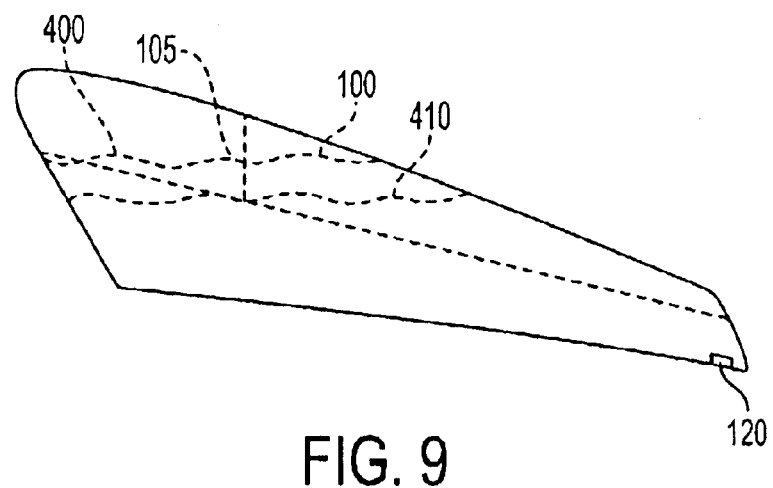
FIG. 9 is a side view of an example of the first embodiment of the invention showing the fuel level at the point where fuel cross-over ends.

FIG. 9 shows how the availability of fuel at left drain hole 120 and right drain hole 130 changes as fuel is drained from the tank. When the level of fuel in tank 10 is above fluid level 410 (for example at fluid level 400), fuel occupying common volume 230 can be drained from either left drain hole 120 or right drain hole 130. However, once the fuel occupying common volume 230 has been used, fuel transfer from one side of the tank to the other is no longer possible. At this point, fuel occupying left lower volume 210 can be drained only from left drain hole 120 and fuel occupying right lower volume 220 can be drained only from right drain hole 130. Due to this structure, a rider beginning with a full fuel tank, need not be concerned whether selector switch 550 is in first open position 554 or second open position 556 because in either position the common volume 230 and only one of the lower volumes 210, 220 will be drained and the remaining lower volume 210, 220 will remain full. When, in this example, the engine stops or begins to stop due to fuel starvation, the operator simply moves selector switch 550 from whichever open position 554, 556 it is in to the other open position 554, 556 to drain the remaining lower volume 210, 220. The operator can then proceed (while burning fuel from the other lower volume) to a gas station to refill tank 10. Once tank 10 is refilled, the operator (unlike with a conventional reserve system) need not be concerned with which open position 554, 556 selector switch 550 is in. This is because no matter which open position 554, 556 is used, the entire tank can not be drained without moving selector switch 550 to the other open position 554, 556. This is unlike a conventional reserve system in which the entire contents of a fuel tank can be drained if the petcock is inadvertently left in the reserve position.

The invention therefore provides a fuel tank and a fuel delivery system that prevents an operator from completely draining a fuel tank without having to manually switch the position of a fuel valve. As a result, the invention greatly reduces the chances of a vehicle operator running out of gas.

Figure 10:
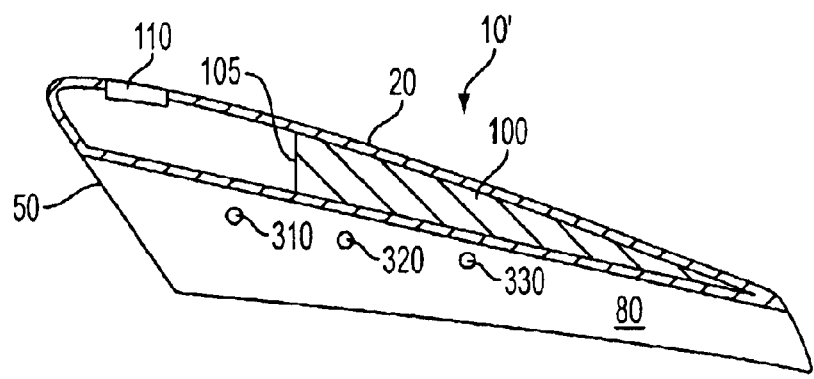
FIG. 10 is a sectional view along section line VIII—VIII shown in FIG. 2 of an example of a second embodiment of the invention.
Figure 11:
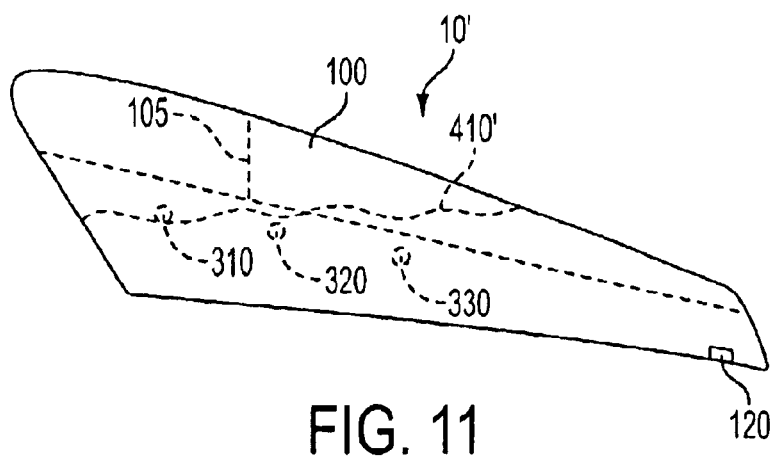
FIG. 11 is a side view of an example of the second embodiment of the invention showing the fuel level at the point where fuel cross-over ends when the cross over tube is in a first position.
Figure 12:
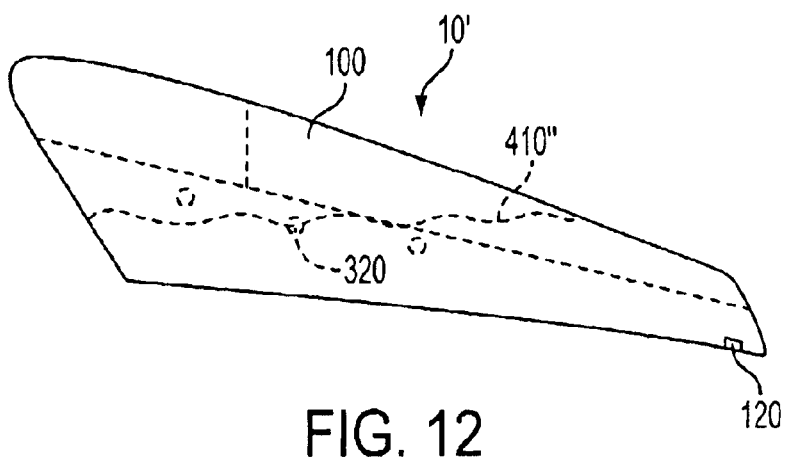
FIG. 12 is a side view of an example of the second embodiment of the invention showing the fuel level at the point where fuel cross-over ends when the cross over tube is in a second position.
Figure 13:
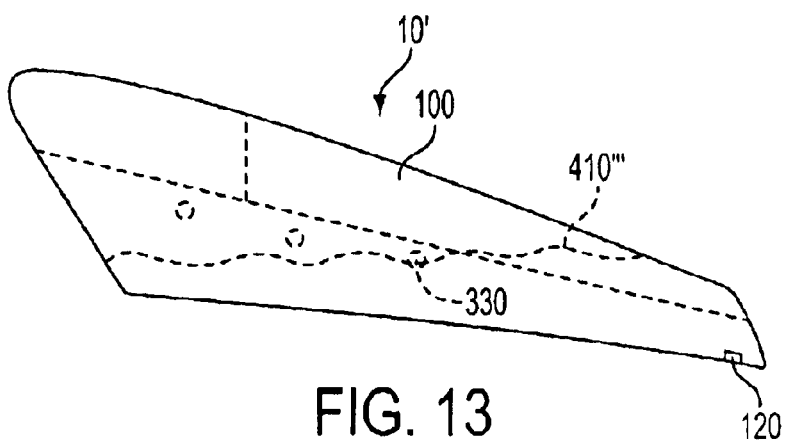
FIG. 13 is a side view of an example of the second embodiment of the invention showing the fuel level at the point where fuel cross-over ends when the cross over tube is in a third position.
Figure 14:
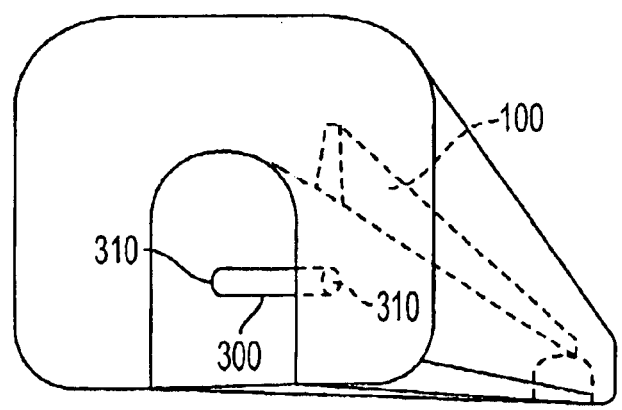
FIG. 14 is an isometric view of an example of the second embodiment of the invention with the cross over tube in the first position.

FIGS. 10–13 illustrate another embodiment of the invention that provides adjustability to the amount of fuel left in tank 10 at the point when selector switch 550 needs to be switched between open positions 554, 556. FIG. 10 shows a tank 10' similar to tank 10 but having a first crossover hole 310, a second crossover hole 320 and a third crossover hole 330 in each of left tunnel wall 70 and right tunnel wall 80. Crossover holes 310, 320 and 330 are used in conjunction with a crossover pipe 300 (shown in FIG. 14) to provide alternate crossover points between the left and right sides of the tank such that the capacity of left lower volume 210 and right lower volume 220 can be adjusted. FIG. 11 shows that when fluid level 410' reaches first crossover holes 310, fluid crossover between the left and right sides of the tank ceases. Comparing FIG. 11 to FIG. 9, it can be seen that fluid level 410' is lower than fluid level 410 and, as a result, the volume of the lower volumes 210, 220 is less in FIG. 11 than in FIG. 9. This is because fluid crossover is permitted through first crossover holes 310 beyond the point which fluid crossover is permitted by partition 100 alone. FIG. 12 shows a fluid level 410'' at which fluid crossover ceases when crossover pipe 300 connects second crossover holes 320. Similarly, FIG. 13 shows a fluid level 410''' at which fluid crossover ceases when crossover pipe 300 connects third crossover holes 330. Crossover hole plugs (not shown) are used to plug crossover holes that are not connected to each other by crossover pipe 300. For example, when crossover pipe 300 connects first crossover holes 310 to each other, crossover hole plugs would be used to plug second crossover holes 320 and third crossover holes 330. By providing pairs of crossover holes (in this example three pairs), an operator can choose the point at which crossover ceases and, therefore, the amount of fuel remaining in the tank when the engine stops and switching between open positions 554, 556 of selector switch 550 is required.

While FIGS. 10–13 show crossover holes 310, 320, 330 located in tunnel walls 70, 80, it is noted that crossover holes may be located in other parts of the tank such as, for example, bottom walls 62, 64. In the example where crossover holes are placed in bottom walls 62, 64, the tank could be positioned on the vehicle such that bottom walls 62, 64 are angled relative to the horizontal. Such tank positioning would result in the crossover holes having different vertical heights than drain holes 120, 130. It is noted that other tank configurations could also provide crossover hole locations having different vertical heights and, therefore, provide different left lower and right lower volumes.

It is noted that although the examples discussed above provide a valve having two open positions and one closed position, other valve configurations having more than one closed position and/or more than two open positions are also contemplated. For example, for those users that prefer to close the fuel valve whenever stopping the vehicle, a valve having two closed positions could be used to provide a reminder to the user as to which open position was last used. Such a valve could have, in this order, open position A, closed position B, closed position C and open position D. When a user stops operating the vehicle and wishes to turn off the fuel supply to the engine, he can move the valve to the closed position closest to the open position being used. If the vehicle was being operated in open position A, then the user moves the valve to closed position B upon stopping. Then, when the user returns to the vehicle, he will be reminded by the valve position B that he should use open position A instead of open position D. This embodiment can help prevent the inadvertent draining of both lower portions of the tank when the vehicle is used for repeated short trips and the user turns the fuel valve off between trips.

While embodiments of the inventions have been described with particular examples described above and shown in the drawings, it is noted that many other configurations achieving the same function can be used. For example, the length and shape of the partition can be varied depending on the shape and size of the fuel tank and the orientation of the fuel tank on the vehicle. For example, the angle relative to horizontal at which the tank is mounted on the vehicle can significantly influence the volume of fuel in the left and right sides of the tank when crossover ceases.

The invention has been described in detail with respect to preferred embodiments and it will now be apparent from the foregoing to those skilled in the art that changes and modifications may be made without departing from the invention in its broader aspects. The invention, therefore, is intended to cover all such changes and modifications that fall within the true spirit of the invention.

What is claimed is:

1. A tank for storing a fluid, the tank comprising:
   an outer shell defining an inner volume for containing the fluid;
   a filler opening in the outer shell for placing the fluid into the tank;
   a partition within the outer shell,
      the partition dividing the inner volume into a first lower portion, a second lower portion, and a common portion;
   a first drain opening located in the first lower portion; and
   a second drain opening located in the second lower portion,
   wherein the partition separates the first lower portion from the second lower portion such that when the tank is in an operating position the fluid is prevented from passing between the first lower portion and the second lower portion.

2. The tank of claim 1, wherein the tank is for storing fuel.

3. The tank of claim 2, wherein the tank is for storing fuel for an internal combustion engine.

4. The tank of claim 3, wherein the tank is a fuel tank on a motorcycle.

5. The tank of claim 1, wherein the outer shell and the partition are configured such that only that portion of the fluid located in the common portion and the first lower portion drains from the tank through the first drain opening.

6. The tank of claim 5, wherein the outer shell and the partition are configured such that only that portion of the fluid located in the common portion and the second lower portion drains from the tank through the second drain opening.

7. The tank of claim 1, wherein the outer shell further comprises a tunnel formed in a lower portion of the outer shell.

8. The tank of claim 7, wherein the partition is attached at its lower edge to a top of the tunnel and is attached at its upper edge to an upper portion of the outer shell.

9. The tank of claim 1, further comprising a first cross over hole located in the first lower portion,
the first cross over hole being located at a position that is higher vertically than the first drain opening when the tank is in the operating position; and
a second cross over hole located in the second lower portion,
the second cross over hole being located at a position that is higher vertically than the second drain opening when the tank is in the operating position.

10. The tank of claim 9, further comprising a third cross over hole located in the first lower portion,
the third cross over hole being located at a position that is higher vertically than the first drain opening when the tank is in the operating position; and
a fourth cross over hole located in the second lower portion,
the fourth cross over hole being located at a position that is higher vertically than the second drain opening when the tank is in the operating position,
wherein the third cross over hole is located at a position that is vertically between the first cross over hole and the first drain opening when the tank is in the operating position, and
the fourth cross over hole is located at a position that is vertically between the second cross over hole and the second drain opening when the tank is in the operating position.

11. The tank of claim 10, further comprising a cross over tube that is repositionable between a first position connecting the first cross over hole to the second cross over hole and a second position connecting the third cross over hole to the fourth cross over hole; and
a pair of cross over hole plugs for plugging the third and fourth cross over holes when the cross over tube connects the first and second cross over holes and for plugging the first and second cross over holes when the cross over tube connects the third and fourth cross over holes.

12. A fuel storage and delivery system for storing fuel and delivering the fuel to an engine, the system comprising:
the tank of claim 1, wherein the fluid is the fuel; and
a fuel valve functionally positioned between the tank and the engine, the valve having
an outlet for functionally connecting to the engine;
a first inlet functionally connected to the first drain opening of the tank;
a second inlet functionally connected to the second drain opening of the tank;
a closed position for preventing the fuel from being delivered to the engine;
a first open position for allowing the fuel to flow from the first inlet to the engine; and
a second open position for allowing the fuel to flow from the second inlet to the engine.

13. The system of claim 12, wherein the outer shell and the partition are configured such that only that portion of the fuel located in the common portion and the first lower portion drains from the tank through the first drain opening.

14. The system of claim 13, wherein the outer shell and the partition are configured such that only that portion of the fuel located in the common portion and the second lower portion drains from the tank through the second drain opening.

15. The system of claim 12, wherein the outer shell further comprises a tunnel formed in a lower portion of the outer shell.

16. The system of claim 15, wherein the partition is attached at its lower edge to a top of the tunnel and is attached at its upper edge to an upper portion of the outer shell.

17. A fuel tank for a motorized vehicle, the tank comprising:
an outer shell defining an inner volume for containing the fuel, the outer shell having a tunnel formed in a lower portion of the outer shell;
a filler opening in the outer shell for placing the fuel into the tank;
a partition within the outer shell,
the partition dividing the inner volume into a first lower portion, a second lower portion, and a common portion, and
the partition being attached at its lower edge to a top of the tunnel and being attached at its upper edge to an upper portion of the outer shell;
a first drain opening located in the first lower portion; and
a second drain opening located in the second lower portion,
wherein the partition separates the first lower portion from the second lower portion such that when the tank is in an operating position the fuel is prevented from passing between the first lower portion and the second lower portion,
the outer shell and the partition are configured such that only that portion of the fuel located in the common portion and the first lower portion drains from the tank through the first drain opening, and
the outer shell and the partition are configured such that only that portion of the fuel located in the common portion and the second lower portion drains from the tank through the second drain opening.

18. A fuel storage and delivery system for storing fuel and delivering the fuel to an engine, the system comprising:
the tank of claim 17; and
a fuel valve functionally positioned between the tank and the engine, the valve having
an outlet for functionally connecting to the engine;
a first inlet functionally connected to the first drain opening of the tank;
a second inlet functionally connected to the second drain opening of the tank;
a closed position for preventing the fuel from being delivered to the engine,
a first open position for allowing the fuel to flow from the first inlet to the engine, and
a second open position for allowing the fuel to flow from the second inlet to the engine.

* * * * *